July 16, 1957 B. V. VONDERSCHMITT 2,799,799
CATHODE RAY DEFLECTION SYSTEMS
Filed June 25, 1953
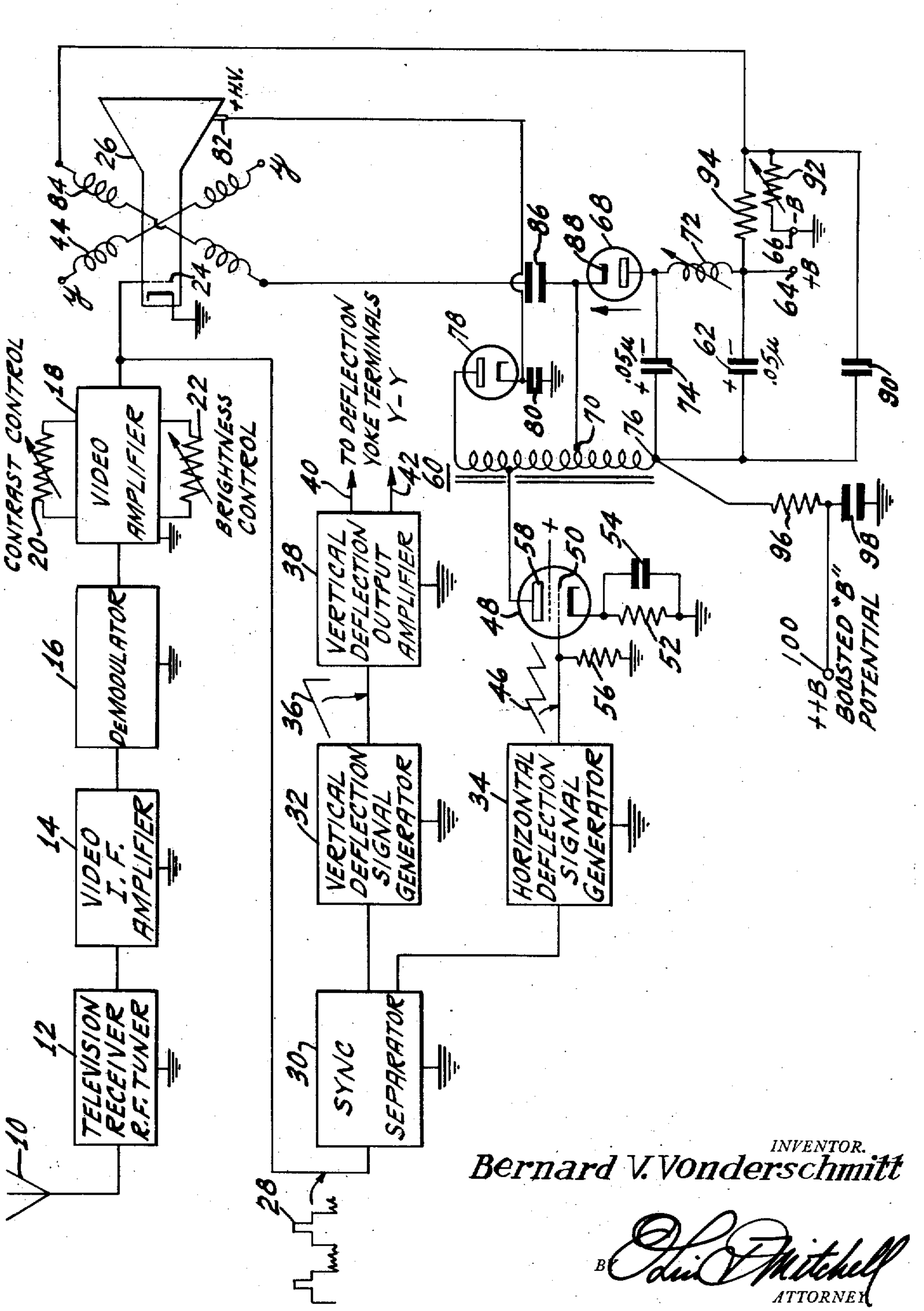
INVENTOR.
Bernard V. Vonderschmitt
BY [signature]
ATTORNEY United States Patent Office 2,799,799 Patented July 16, 1957

2,799,799

CATHODE RAY DEFLECTION SYSTEMS

Bernard V. Vonderschmitt, Merchantville, N. J., assignor to Radio Corporation of America, a corporation of Delaware Application June 25, 1953, Serial No. 364,092

2 Claims. (Cl. 315—27)

The present invention relates to improvements in cathode ray beam deflection systems, and more particularly, although not necessarily exclusively, to improvements in cathode ray beam systems of the power recovery type commonly employed in home television receivers.

The design of home instrument television receivers is constantly fraught by the ever-increasing demand by the public for larger television screens. As the screen area of direct view picture tubes or kinescopes becomes greater for a given overall length of picture tube, it follows that the angle of deflection for proper scansion of the tube screen becomes greater. This greater deflection angle in turn demands the provision of greater deflection power.

In the attempt to provide adequate wide angle cathode ray beam deflection power in television receiving circuits with given available power supply potential and amplifier tube types, there have been numerous boot-strap type deflection circuits. These circuits are often referred to as power recovery deflection circuits and operate to recover othewise wasted magnetic energy cyclically stored in the electromagnetic deflection yoke. Means are provided for transducing this energy into a voltage increase in the anode voltage applied to the deflection amplifier output tube. An example of such a circuit is described at length in U. S. Patent No. 2,563,839, to E. L. Clark, entitled "Power Recovery Cathode Ray Beam Deflection System."

A study of the prior art power recovery deflection systems, as exemplified in the above Clark patent, will show that in most cases the cathode ray beam deflection yoke being driven by the high efficiency deflection amplifier is submitted to higher direct current voltage stresses than encountered in lower efficiency systems. Specifically, it will be found that in many power recovery deflection circuits the deflection yoke winding is connected with a point in the deflection circuit which evidences the increase in power supply potential developed by the power recovery action of the circuit. This additional voltage, frequently termed "B boost voltage," in many cases causes breakdown of the voltage insulation between the horizontal and vertical deflection windings in a standard electromagnetic deflection yoke.

It is, therefore, an object of the present invention to provide an improved electromagnetic cathode ray beam deflection circuit of the power recovery type in which voltage stresses on deflection yoke windings connected with the circuit are reduced to a minimum.

It is a further object of the present invention to provide an improved power recovery electromagnetic deflection circuit which permits the horizontal and vertical deflection windings of an associated deflection yoke to operate substantially at the same direct current potential.

It is still another object of the present invention to provide an improved electromagnetic cathode ray beam deflection circuit suitable for use in home television receivers in which "B-boost" or power recovery action is achieved without imposing excessive voltage stresses upon the driven cathode ray beam deflection yoke.

It is still another object of the present invention to provide novel circuit means in a power recovery type deflection circuit for permitting adjustment of the direct current potential of an electromagnetic cathode ray beam deflection yoke winding independently of the direct current voltage applied to or the power recovery voltage developed by the deflection circuit.

In the realization of the above objects and features of advantage, the present invention in one of its more general forms, involves the serial connection of an auto transformer and capacitor between the anode of the deflection output amplifier and a source of positive potential. A power recovery diode is then connected from a point along the auto transformer winding and the point of power supply potential. The deflection yoke winding to be driven is then capacitively coupled in shunt with the diode with a direct current connection being made from the deflection yoke winding to a point of fixed positive potential.

A further appreciation of the objects and advantages of the present invention as well as a more complete understanding of its mode of operation will be gleaned from a reading of the following specification, especially when taken in connection with the accompanying drawing in which is shown a combination block and schematic diagram of one form of television receiving circuit embodying the novel features of the present invention.

Turning now to the figure, there is indicated at 10 a television radio receiving antenna designated to intercept television broadcast signals and apply them to a television receiver R. F. tuner at 12. Output signal from the R. F. tuner 12 is applied to the video I. F. amplifier 14 whose output signal is conventionally applied to a demodulator circuit 16. The demodulated television signal appearing in the output circuit of the demodulator circuit 16 is in turn applied in a conventional manner to some form of video signal amplifier 18. The video amplifier 18 is indicated as being provided with contrast control means 20 and brightness control means 22. The control electrode 24 of the picture kinescope 26 is adapted to be driven by output signal from the video amplifier 18.

Composite television signal 28 appearing at the output of the video amplifier 18 is also applied to a synchronizing signal separator circuit, commonly referred to as a "sync separator" as indicated at 30 in the figure. In further accordance with well known practice, the sync separator circuit 30 will supply the vertical deflection signal generator 32 with vertical synchronizing signal while supplying the horizontal deflection signal generator 34 with horizontal synchronizing signal. The vertical scanning sawtooth developed by the deflection generator 32, indicated at 36, is employed in a conventional fashion to drive the vertical deflection output amplifier 38. Output terminals 40 and 42 of the vertical deflection output amplifier 38 are indicated for connection to terminals *y*—*y* of the vertical deflection yoke winding 44. The deflection yoke winding 44 is shown as embracing the neck of the kinescope 26. Correspondingly, the horizontal scanning sawtooth waveform 46, appearing at the output circuit of the horizontal deflection signal generator 34, is utilized to drive the horizontal deflection output amplifier tube 48. To accomplish this, the deflection signal 46 is applied to the control electrode 50 of the tube 48. In further accordance with conventional practice, a cathode bias resistor 52, shunted by a suitable by-pass capacitor 54, is inserted in the cathode circuit of the output tube 48. A grid return resistor 56 is also connected from the control electrode 50 to a datum potential such as circuit ground.

The circuitry thus far described, illustrated in the most part by block diagram representations, represents conventional prior art practice as illustrated for example in volume 7 of Rider's Television Manual 1952. In this manual will be found a variety of circuit arrangements useful in providing the functions depicted by the block elements of the figure described above.

In accordance with the present invention the load circuit connected with the anode 58 of the horizontal deflection output tube 48, comprises an auto transformer 60 connected in series with a capacitor 62 to form a combination. This combination is in turn connected between the anode 58 and the B-power supply terminal 64. The negative terminal of the B-power supply system is indicated at 66 and is shown connected with circuit ground. A diode 68 is connected from a point 70 along the auto transformer 60 through a linearity control inductance 72 to the positive power supply terminal 64. A linearity control capacitor 74 is shown connected from the upper extremity of the linearity control inductance 72 to the lower extremity of the auto transformer winding. For purposes of circuit description, this lower extremity point has been designated by the terminal index 76. A high voltage rectifying diode 78 has been shown as connected across the upper extremity of the auto transformer winding. This feature is in accordance with prior art practice to develop a beam accelerating voltage across the capacitor 80 for application to the ultor 82 of the kinescope 26.

In further accordance with the present invention, the horizontal deflection yoke winding 84 shown embracing the neck of the kinescope 26 is coupled via capacitor 86 to the anode 88 of the power recovery damping diode 68. The other extremity of the deflection yoke winding 84 is connected via capacitor 90 to the lower extremity 76 of the auto transformer 60. In still further accordance with the present invention, the upper extremity of the horizontal deflection yoke winding is established at some D. C. potential value dictated by the voltage dividing action of the resistor elements 92 and 94. Resistors 92 and 94 form a voltage divider across the B-power supply terminal 64 to ground. One of the resistive elements may be made variable or the two elements replaced by a tapped resistance voltage divider means. The effect of such an arrangement, however, is to permit the D. C. operating level of the horizontal deflection yoke winding 84 to be established in any desirable value above circuit ground potential as described hereinafter.

The operation of the power recovery deflection circuit described above is well known in the art, as for example described in the above-identified patent to Clark. Briefly, the horizontal sawtooth waveform 46 employed to drive the horizontal output amplifier 48 causes conduction in the tube 48 only during the latter portion of the deflection cycle. The conduction periods of tube 48 define the latter portions of the sawtooth deflection current trace cycles in the winding 84. At the end of the trace portion of the deflection waveform 46, current in the tube 48 is quickly cut off to commence what is known as the retrace interval of the deflection cycle. At this time, the voltage across the diode 68 swings in a direction so as to produce conduction therein. This conduction tends to damp the oscillations or ringing which would otherwise occur across the deflection yoke due to the magnetic energy stored in it (as well as the auto transformer winding) at the termination of the trace portion of the deflection cycle. The current flow through the diode 68 will tend to charge the capacitors 62 and 74 with the polarity shown in the figure. This in effect raises the potential of the terminal 76 by the value of the voltage charge across the capacitors 62 and 74. The voltage appearing at terminal 76 is known as "B-boost" voltage and is available to the anode 58 of the amplifier 48. The efficiency of the amplifier stage as a whole is thereby increased by a significant amount. The B-boost voltage at terminal 76 will, however, include certain ripple components corresponding to the deflection frequency. This may be filtered out by the intergrating network comprising resistor 96 and capacitor 98. Output terminal 100 will, therefore, display a substantially ripple-free power supply potential of a value considerably greater than the plus B potential at terminal 64. The terminal 100 may be applied to other circuits in the television receiver which require or whose performance may be improved through the use of higher B power supply voltages.

Since, in accordance with the present invention, the horizontal deflection yoke 84 is capacitively coupled to the auto transformer winding 60, it is apparent that the B-boost potential will not appear at any point along the deflection yoke winding. In fact, the deflection yoke winding 84 may be made to assume most any desired potential relative to ground by means of the voltage divider system 92 and 94 described above, or a supplementary voltage supply (not shown). In this way the horizontal deflection winding 84 may be made to assume a potential value which is equal to the D. C. potential value of the vertical deflection yoke winding 44. This possibility renders the voltage insulation requirements between the horizontal and vertical deflection windings of an electromagnetic deflection yoke much less severe than in prior art systems.

What is claimed is:

1. In an autotransformer type boosted B potential cathode ray beam deflection system, the combination of: a source of deflection signal; an electron discharge tube having at least an anode, cathode and control electrode; a circuit ground potential datum means; an autotransformer having a winding bearing high, intermediate, and low impedance taps; a cathode ray beam deflection yoke having a horizontal and vertical deflection winding insulated from one another to a degree preventing breakdown of said yoke when the potential of said horizontal winding is held below a given maximum with respect to said ground datum means, said horizontal deflection winding having two access terminals; a direct current connection from said anode to said high impedance tap; a source of anode polarizing potential referenced to said datum means, said polarizing potential source supplying a potential of a value below said given maximum; signal coupling means operatively connected between said signal source and said discharge tube applying deflection signals in driving relation thereto between said cathode and said control electrode; a first capacitor connected from said intermediate impedance tap to one of said access terminals; a direct current connection from said polarizing potential source to said other access terminal to establish the D. C. potential level of said horizontal winding at a value not greater than that supplied by said polarizing potential source; a second capacitor connected from said low impedance tap to said polarizing potential source; a rectifier connected from said intermediate impedance tap to said polarizing potential source with a polarity to pass anode current flow to said tube and in reaction scanning relation to said horizontal deflection winding such that a boost is effectuated in the D. C. potential appearing at said low impedance tap over that delivered by said polarizing source and without increasing the D. C. potential of said deflection winding.

2. In an autotransformer type boosted B potential cathode ray beam deflection system, the combination of: a source of deflection signal; an electron discharge tube having at least an anode, cathode and control electrode; a circuit ground potential datum means; an autotransformer having a winding bearing high, intermediate, and low impedance taps; a cathode ray beam deflection yoke having a horizontal and a vertical deflection winding insulated from one another to a degree preventing breakdown of said horizontal winding when the potential of said horizontal winding is held below a given maximum with respect to said ground datum means, said horizontal deflection winding having two access terminals; a source of anode polarizing potential referenced to said datum means, said polarizing potential source supplying a potential of a value below said given maximum; signal coupling means operatively connected between said signal source and said discharge tube applying deflection signals in driving relation thereto between said cathode and said control electrode; a first capacitor connected from said intermediate impedance tap to one of said access terminals; a voltage dividing network connected from said source of anode polarizing potential to circuit ground having a tap thereon presenting a D. C. potential intermediate between the potential supplied by said source and circuit ground; a direct current connection from said voltage dividing network tap to said other horizontal deflection winding access terminal to establish the D. C. potential level of said horizontal deflection winding at the potential of said voltage dividing network tap; a second capacitor connected from said low impedance tap to said anode potential source and a rectifier connection from said intermediate impedance tap to said anode potential source with a polarity passing anode current flow to said tube and in a reaction scanning relation to said horizontal deflection winding such that a boost is effectuated in the D. C. potential of said low impedance tap over that delivered by said polarizing potential source but without increasing the D. C. potential of said deflection winding.

References Cited in the file of this patent

UNITED STATES PATENTS

| | | |
|---|---|---|
| 2,523,108 | Friend | Sept. 19, 1950 |
| 2,543,305 | Schwarz | Feb. 27, 1951 |
| 2,555,832 | Denton | June 5, 1951 |
| 2,566,510 | Barco | Sept. 4, 1951 |
| 2,611,106 | Fyler et al. | Sept. 16, 1951 |
| 2,620,457 | Crooker | Dec. 2, 1952 |
| 2,664,521 | Schlesinger | Dec. 29, 1953 |